United States Patent
Greens

(10) Patent No.: US 7,020,075 B2
(45) Date of Patent: Mar. 28, 2006

(54) COMMUNICATION STACK

(75) Inventor: Ronald Maria Albert Greens, Schoten (BE)

(73) Assignee: Alcatel, Paris (FR)

( * ) Notice: Subject to any disclaimer, the term of this patent is extended or adjusted under 35 U.S.C. 154(b) by 904 days.

(21) Appl. No.: 09/879,175

(22) Filed: Jun. 13, 2001

(65) Prior Publication Data

US 2001/0053131 A1    Dec. 20, 2001

(30) Foreign Application Priority Data

Jun. 20, 2000    (EP)    ................................ 00401763

(51) Int. Cl.
*H04L 1/00*    (2006.01)

(52) U.S. Cl. ........................... 370/216; 709/228; 714/4

(58) Field of Classification Search ................ 370/216, 370/469; 709/227, 228, 237, 224; 714/1, 714/2, 4

See application file for complete search history.

(56) References Cited

U.S. PATENT DOCUMENTS

| | | | | |
|---|---|---|---|---|
| 5,027,269 | A | * | 6/1991 | Grant et al. ................. 709/224 |
| 5,937,165 | A | * | 8/1999 | Schwaller et al. ........... 709/224 |
| 6,182,139 | B1 | * | 1/2001 | Brendel ....................... 709/226 |
| 6,757,289 | B1 | * | 6/2004 | Cain et al. ................... 370/401 |
| 6,779,033 | B1 | * | 8/2004 | Watson et al. ............... 709/227 |

OTHER PUBLICATIONS

Y. Zhang et al, "A Persistent Connection Model for Mobile and Distributed Systems" Proceedings of the International Conference on Computer Communications and Networks, Sep. 20, 1995, XP000874354.
S. Keshav, "An Engineering Approach to Computer Networking", 1997, XP002152748, p. 326.
Unix Networking Programming, vol. 1 by Richard Stevens, Chapter 2.

* cited by examiner

*Primary Examiner*—Steven Nguyen
*Assistant Examiner*—Clemence Han
(74) *Attorney, Agent, or Firm*—Sughrue Mion, PLLC

(57) ABSTRACT

The present invention relates to a communications stack, for connection management in a communications system. The communications system consists of at least two communicating application programs. Both application programs communicate over a connection via the communications stack. The communication stack comprises a connection resetting means that is adapted to reset the connection by closing all connection involved elements, a signal reception means that is able to receive at least one signal for managing said connection and a connection persisting means that is adapted to keep the connection persistent. The communications stack additionally contains a decision means that is adapted to delay the reset of the connection if a terminated application signal is received via the signal reception means. If the communication stack subsequently, via the signal reception means, receives a successful application restart signal, the decision means decides to persist the connection if the application restart signal is received before expiration of said delay.

10 Claims, 2 Drawing Sheets

US 7,020,075 B2

COMMUNICATION STACK

BACKGROUND OF THE INVENTION

The present invention relates to a communications stack that is used in a communications system comprising at least two communicating application programs. The application programs communicate over a connection via the communications stack, which comprises a connection resetting means, adapted to reset the connection by closing all connection-involved elements. The communications stack further comprises a signal reception means, adapted to receive at least one signal for managing the connection and a connection persisting means, coupled with an input to an output of the connection resetting means and adapted to keep the connection persistent.

Communications stacks are already known in the art, e.g., from "UNIX NETWORK PROGRAMMING" Volume 1 by W. Richard Stevens. More particularly, chapter 2 thereof describes that at a Unix process termination, either voluntarily or involuntarily, all open descriptors are closed which will cause any TCP connection that is still open to be closed.

This means that, in case of an application crash, which is called an involuntarily application close, or a software upgrade, which is called a voluntarily application close, the connection between the two communicating applications is consequently reset. The situation wherein subsequently a group of network settings is reset because of the connection reset can be imagined. If, in case of such a involuntary application close, the application is restarted immediately after the close, the connection between the communicating applications has to be re-established which is inefficient, from a point of view of network load and/or processing load in re-connecting both applications.

At this close, an application communicating with a peer application, where the application or the peer application is closing or being closed, the connection between both applications is subsequently closed by means of closing the communication socket under control of at least one protocol message.

SUMMARY OF THE INVENTION

An aspect of the present invention is to provide a communications stack of the above known type but wherein the efficiency of the connection management has improved.

According to the invention, this aspect is achieved by the communication stack as defined in claim 1 and the communication network element as defined in claim 3.

In this way, by delaying the resetting of a connection as consequence of an application that is closed voluntarily or involuntarily, the reset of the connection between the two routers is delayed during a predetermined period of time. If before the expiry of the predetermined period of time a signal is received indicating the successful restart of the application, the connection is kept persistent. Hence, no connection reestablishment is necessary and consequently no network conditions updating is required. This results in a connection management with an improved efficiency.

The decision means additionally is adapted to change said delay based on the restart time of an application program. In this way, the persistency of a connection is even better adapted to the application by configuring the delay-time dependent on the restart time of the application program. A small application program may have a very short restart time, meaning that the connection resetting delay may be quite short to guarantee proper functioning. However, with respect to a larger application program, having a substantially larger restart time, the delay time needs to be substantially large in order not to let the delay time expire and consequently, still reset the application program. Hence, by adapting the delay-time of the connection reset to the application program, the connection persistency is even better performed.

The functionality of such a Communication Network Element can be performed by a Border Gateway Protocol Router (ROU).

BRIEF DESCRIPTION OF THE DRAWINGS

The above and other aspects and features of the invention will become more apparent and the invention itself will be best understood by referring to the following description of an embodiment taken in conjunction with the accompanying drawings wherein.

DETAILED DESCRIPTION OF THE INVENTION

Figure 1:
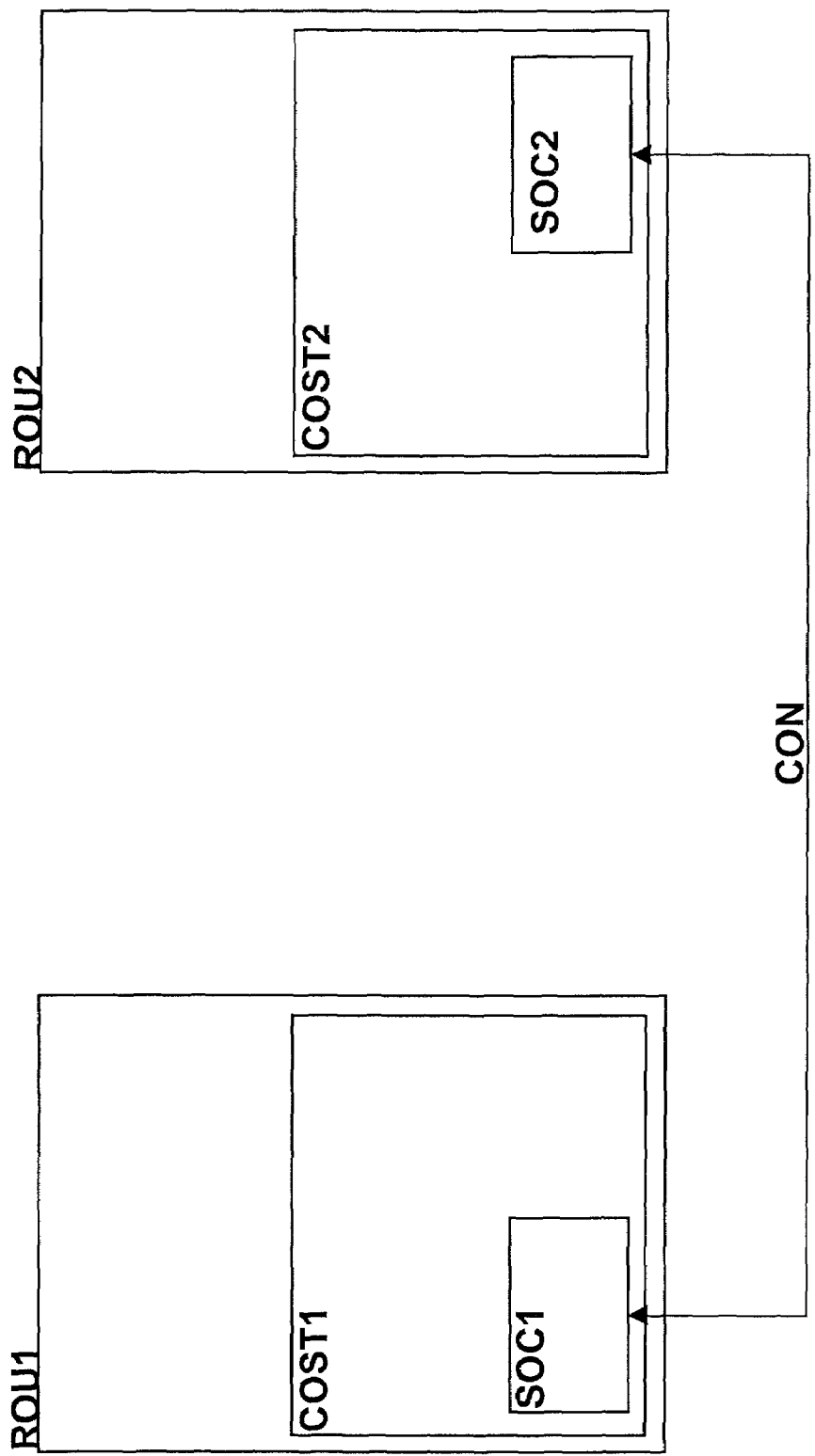
FIG. 1 represents a couple of communicating routers making part of an entire internet network.

In the following paragraphs, referring to the drawings, an implementation of the present invention will be described. In the first part of this description, the main elements of the network environment together with its interconnections, as presented in FIG. 1, are described.

Subsequently, the main elements of the router ROU1, as presented in FIG. 2, wherein the communication stack of the present invention is shown, are described. This part is succeeded by a description of all interconnections between each of the before mentioned main elements of router ROU1. Finally, the execution of the implementation of the present invention is described.

It is assumed that the network environment of the present invention is an internet network comprising a plurality of routers connecting a plurality of user terminals. In order to keep simplicity in this description it is chosen to describe only two communicating routers thereof. This selection is sufficient to properly describe the principle of the present invention.

The main elements of the present embodiment, as presented in FIG. 1, are two routers ROU1, ROU2 more specifically internet protocol routers, further referred to as IP-routers. The IP-router handles the routing of IP-packets from one router to the subsequent one, based on an IP-address of the destination of the packet. Each of the routers contains a communication stack COST1, COST2, for management of a connection between two or more network elements or a part thereof, in this case between two IP-routers ROU1, ROU2. In its turn each communications stack COST1, COST2 comprises an IP-socket SOC1, SOC2 each constituting a connection endpoint of the IP-link CON and configured to implement the connection persistency. For the proper execution of the present invention it is necessary to have at least the IP-socket SOC1 of router ROU1 configured for persistency.

Figure 2:
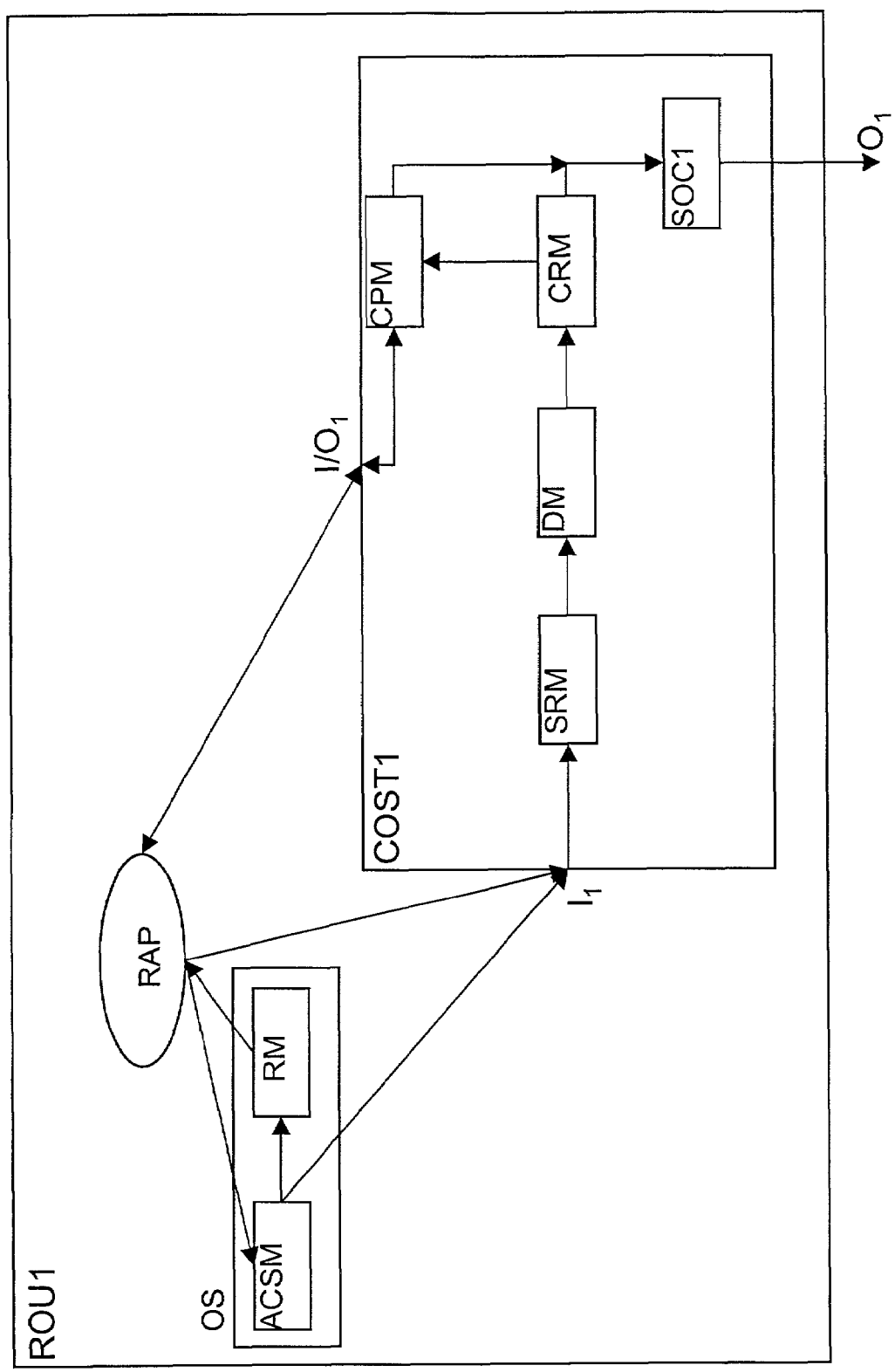
FIG. 2 represents the functional structure of the corresponding IP-communication stack COST1 of Router ROU1.

The Router ROU1 as presented in FIG. 2 contains a router application RAP supporting the Border Gateway Protocol further referred to as BGP. Such a BGP router application RAP is running on an operating system of each of these routers for enabling the routers to share routing information, based whereon the IP-packet routing is performed. The router ROU1 further contains an application crash signalling means ACSM that is adapted to detect that the router application RAP has crashed by means of polling and at detection of a crash to generate a signal indicating that the corresponding application, in this case, that the BGP router-application RAP has crashed. Additionally, there is a respawning means RM that is adapted to generate a signal to restart the BGP router application RAP and additionally notify the signalling reception means SRM of the router ROU1 that the BGP router application RAP has successfully restarted. Both the application crash signalling means ASCM and the respawning means RM form part of the operating system OS.

The communications stack COST1, as presented in FIG. 2, is built up of a signal reception means SRM that is adapted to receive signals used for managing the connection over the IP-link between two routers ROU1, ROU2. A decision means DM is adapted to delay the resetting of the connection if the received signal is an application crash signal and subsequently to decide not to reset the connection if a subsequent signal is a successful application restart signal and this application restart signal is received before expiration of the delay. Additionally, there is a connection persisting means CPM that is adapted to keep the connection persistent by simulating that the other side is still there. Lastly, there is a connection resetting means CRM that is adapted to reset the connection over the IP-link between two routers by closing all in the connection involved elements. Additionally, the connection resetting means is adapted to notify the connection persisting means to stop keeping the connection persistent.

The BGP router application RAP is at first coupled to an input/output-terminal I/O$_1$ of the communication stack COST1. The BGP router application RAP further has an output that is coupled to an input of the application crash signalling means ACSM. Third, there is an output of the BGP router application RAP that is coupled to input I$_1$ of the communication stack COST1. The respawning means RM in its turn has an output-terminal that is coupled to an input-terminal of the BGP router application RAP. The application crash signalling means ACSM further is coupled with an output terminal to an input-terminal I$_1$ of the communications-stack and is at the same time coupled with a second output to an input of the respawning means.

The signal reception means SRM has an input-terminal that is at the same time an input-terminal I$_1$ of the IP communication stack COST1. The signal reception means SRM on the other hand, is coupled with an output to an input of the decision means DM. The decision means DM in its turn is coupled with an output to an input of the connection resetting means CRM.

The connection resetting means CRM is coupled with an output to an input of IP socket SOC1. The IP socket SOC1 has an output-terminal O$_1$ that is at the same time an output of the communication stack COST1. The connection persisting means CPM in its turn, also has an output-terminal that is at the same time an input/output-terminal I/O$_1$ of the communication stack COST1. The connection resetting means CRM additionally has an output that is coupled to an input of the connection persisting means CPM. The connection persisting means CPM further has an input/output-terminal that is coupled to an input/output-terminal of the socket SOC1. In order to explain the execution of the present invention, it is assumed that the BGP router application RAP being executed by an operating system on router ROU1 closes involuntarily because of an application crash or voluntarily because of a software upgrade. The application crash signalling means ACSM detects the close of the BGP router application RAP and subsequently sends a connection terminated-signal to the signal reception means SRM of the communication stack COST1 and at the same time to the respawning means RM, forming part of the operating system OS, of the router application ROU1. The signal reception means SRM forwards the signal towards the decision means DM that, at reception of the connection terminated-signal, delays the reset of the connection during a predetermined period of time by not forwarding the connection terminated signal to the connection resetting means CRM during the delay-time.

In the meantime, the respawning means RM of the router ROU1 has received a signal indicating that the BGP router application RAP has crashed and is to be restarted. Therefore, the respawning means RM, will initiate the restart of the BGP router application RAP of ROU1 and after a successful restart thereof, this router application RAP sends a signal indicating that the router application RAP has successfully restarted to the signal reception means SRM of the communication stack COST1. Subsequently, the signal reception means SRM forwards the received signal towards the decision means DM that in its turn decides not to reset the connection at reception of the respawn-signal which is accomplished by not at all activating the connection resetting means CRM and hence leaving the connection persisting means CPM ignorant about the application crash. This is only the case if this respawn-signal is received at the decision means before expiry of the delayed resetting of the connection. Thus, the connection persisting means CPM keeps notifying the peer router ROU1 of normal functioning of the connection. In the meantime, the BGP router application performed the restart without affecting any other network element and corresponding settings.

In this way, at an application crash the connection is kept up. Hence, all BGP routing tables need not be adapted for the reset connection and subsequently again for a newly established connection.

Although the above embodiments of the invention have been described by means of functional blocks, their detailed realisation based on their functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

The application of the present invention is not restricted to this embodiment wherein the present invention is implemented in a set of routers but may also applied in other network elements.

The invention claimed is:

1. A Communications stack for connection management, which is used in a communications system comprising at least two communicating application programs, one of said application programs communicating to the other of said application programs over a connection via said communications stack, said communications stack comprising:

connection resetting means for resetting said connection by closing all connection involved elements for said one application program;

signal reception means for receiving at least one signal for managing said connection;

connection persisting means coupled to said connection resetting means and for keeping said connection persistent; and decision means coupled to said signal reception means and to said connection resetting means and for delaying said reset of said connection if said at least one signal is a terminated application signal and subsequently for deciding to persist said connection if a further said at least one signal is a successful application restart signal and said application restart signal is received before expiration of said delay.

2. The Communications stack according to claim 1, wherein said decision means is adapted to change said delay based on a restart time of said application program.

3. A network comprising at least one Communication Network Element, said Communication Network Element comprising at least one communication stack as claimed in claim 1.

4. The network according to claim 3, wherein said at least one Communication Network Element is a Border Gateway Protocol Router.

5. The network according to claim 3, wherein said communication stack comprises an IP socket configured for persistency.

6. A communications stack for connection management, which is used in a communications system comprising at least two communicating application programs, each of said application programs communicating with each other over a connection, each of said applications programs executing its own communications stack, said communications stack comprising:

connection resetting means for resetting said connection by closing all connection involved elements for its application program;

signal reception means for receiving at least one signal for managing said connection for its application program;

connection persisting means coupled to said connection resetting means and for keeping said connection persistent; and decision means coupled to said signal reception means and to said connection resetting means and for delaying said reset of said connection if said at least one signal is a terminated application signal and subsequently for deciding to persist said connection if a further said at least one signal is a successful application restart signal and said application restart signal is received before expiration of said delay.

7. The communications stack according to claim 6, wherein said decision means is adapted to change said delay based on a restart time of said application program.

8. A network comprising at least one communication network element, said communication network element comprising at least one communication stack as claimed in claim 6.

9. The network according to claim 8, wherein said at least one Communication Network Element is a Border Gateway Protocol Router.

10. The network according to claim 8, wherein said communication stack comprises an IP socket configured for persistency.

* * * * *